(12) United States Patent
Huang et al.

(10) Patent No.: US 8,362,152 B2
(45) Date of Patent: Jan. 29, 2013

(54) MODIFIED CONJUGATED DIENE-VINYL AROMATIC COPOLYMER AND METHOD FOR MANUFACTURING THE SAME

(75) Inventors: Chen-Pao Huang, Tainan (TW);
Kuei-Lun Cheng, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 13/339,799

(22) Filed: Dec. 29, 2011

(65) Prior Publication Data

US 2012/0172527 A1 Jul. 5, 2012

(30) Foreign Application Priority Data

Dec. 31, 2010 (TW) ................................ 99147327 A

(51) Int. Cl.
*C08F 8/00* (2006.01)
*C08F 136/00* (2006.01)
(52) U.S. Cl. ........ 525/192; 525/193; 525/194; 525/198; 525/331.9; 525/326.1
(58) Field of Classification Search .................. 525/192, 525/193, 194, 198, 326.1, 331.9
See application file for complete search history.

(56) References Cited

U.S. PATENT DOCUMENTS

| | | | | |
|---|---|---|---|---|
| 4,396,751 A * | 8/1983 | Kampf et al. .................. | 526/279 |
| 4,647,625 A * | 3/1987 | Aonuma et al. ............... | 525/232 |
| 5,128,416 A * | 7/1992 | Imai et al. ...................... | 525/254 |
| 5,189,109 A * | 2/1993 | Imai et al. ...................... | 525/296 |
| 5,219,938 A * | 6/1993 | Imai et al. ...................... | 525/102 |
| 5,508,333 A * | 4/1996 | Shimizu ......................... | 524/424 |
| 5,821,290 A * | 10/1998 | Labauze ........................ | 524/188 |
| 7,041,761 B2 * | 5/2006 | Halasa et al. .................. | 526/279 |
| 7,342,070 B2 * | 3/2008 | Tsukimawashi et al. ..... | 525/105 |
| 7,534,839 B2 * | 5/2009 | Lawson et al. ............. | 525/331.9 |
| 7,781,533 B2 * | 8/2010 | Ozawa et al. .............. | 525/331.9 |
| 8,071,682 B2 * | 12/2011 | Maeda et al. .................. | 525/102 |
| 8,110,635 B2 * | 2/2012 | Maeda et al. .................. | 525/375 |
| 2005/0203251 A1 * | 9/2005 | Oshima et al. ................ | 525/192 |
| 2006/0004143 A1 * | 1/2006 | Inagaki et al. ................ | 525/192 |
| 2008/0027171 A1 * | 1/2008 | Yan et al. ....................... | 524/612 |
| 2008/0051552 A1 * | 2/2008 | Luo et al. ....................... | 528/378 |
| 2008/0103252 A1 * | 5/2008 | Brumbaugh et al. ......... | 524/612 |
| 2008/0146745 A1 * | 6/2008 | Luo et al. ....................... | 525/342 |
| 2008/0289740 A1 * | 11/2008 | Mori et al. ..................... | 152/450 |
| 2009/0043055 A1 * | 2/2009 | Luo et al. ......................... | 526/66 |
| 2009/0163668 A1 * | 6/2009 | Yamada et al. ............ | 525/331.9 |
| 2009/0203826 A1 * | 8/2009 | Rachita et al. ................ | 524/445 |
| 2009/0203843 A1 * | 8/2009 | Fukuoka et al. .............. | 525/105 |
| 2010/0280217 A1 * | 11/2010 | Luo et al. ....................... | 528/319 |
| 2012/0059112 A1 * | 3/2012 | Luo et al. ....................... | 524/572 |

\* cited by examiner

*Primary Examiner* — Robert S Loewe
(74) *Attorney, Agent, or Firm* — McClure, Qualey & Rodack, LLP

(57) ABSTRACT

A modified conjugated diene-vinyl aromatic copolymer and a method for manufacturing the same are provided. The modified conjugated diene-vinyl aromatic copolymer is formed by modifying a conjugated diene-vinyl aromatic copolymer by reacting with a first modifier in a solvent and then reacting with a second modifier. The solvent contains an organic alkali metal initiator. The first modifier is expressed as chemical formula (I):

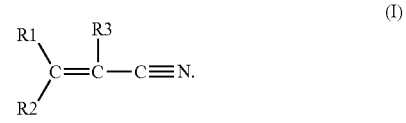

The second modifier is expressed as chemical formula (II):

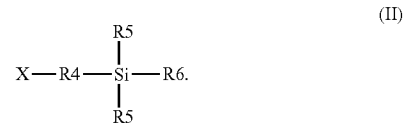

R1 is selected from one of hydrogen, methyl group or ethyl group. R2 is selected from hydrogen. R3 is selected from one of hydrogen, methyl group or ethyl group. X is selected from one of epoxypropoxy group, isocyanate group or 2-(3,4-epoxycyclohexyl) group. R4 is selected from one of alkyl groups with 2~3 carbon atoms.

31 Claims, No Drawings

MODIFIED CONJUGATED DIENE-VINYL AROMATIC COPOLYMER AND METHOD FOR MANUFACTURING THE SAME

This application claims the benefit of Taiwan application Serial No. 099147327, filed on Dec. 31, 2010, the subject matter of which is incorporated herein by reference.

BACKGROUND OF THE INVENTION

1. Field of the Invention

The invention relates to a modified conjugated diene-vinyl aromatic copolymer and a method for manufacturing the same, and more particularly to a modified conjugated diene-vinyl aromatic copolymer highly compatible with silica and a method for manufacturing the same.

2. Description of the Related Art

Conjugated diene-vinyl aromatic copolymer can be used as a material for manufacturing tire. For tires, rolling resistance and wet skid are crucial factors to saving energy consumption and increasing driving safety. Currently, carbon black is added to the conjugated diene-vinyl aromatic copolymer to increase the strength of the tire. In recent years, due to the depletion of oil resource and the global warming issue, the tire industries replace carbon black with silica with an aim of improving the rolling resistance of the tire and therefore reduce energy loss. In comparison with carbon black, silica is more difficult to be uniformly distributed in the conjugated diene-vinyl aromatic copolymer. Therefore, the compatibility between silica and conjugated diene-vinyl aromatic copolymer needs to be further increased. According to one improvement method, when adding silica to the conjugated diene-vinyl aromatic copolymer for manufacturing tire, a modifier is used to perform blending. However, such blending modification normally does not do much good in the copolymer modification due to non-unformed distribution and poor reaction. To the worse, after a long duration of storage, the residual un-reacted modifier may even jeopardize the properties of the substances. Therefore, how to provide a conjugated diene-vinyl aromatic copolymer with silica well distributed in and a method for manufacturing the same has become a prominent task for the industries.

SUMMARY OF THE INVENTION

The invention is directed to a modified conjugated diene-vinyl aromatic copolymer and a method for manufacturing the same. The modified conjugated diene-vinyl aromatic copolymer is highly compatible with silica, has excellent performance in wet skid resistance and rolling resistance after being mixing with silica, and helps to reduce energy loss for vehicles.

According to a first aspect the present invention, a method for manufacturing modified conjugated diene-vinyl aromatic copolymer is provided. The modified conjugated diene-vinyl aromatic copolymer is formed by modifying a conjugated diene-vinyl aromatic copolymer by reacting with a first modifier in a solvent and then reacting with a second modifier. The solvent contains an organic alkali metal initiator. The first modifier is expressed as chemical formula (I):

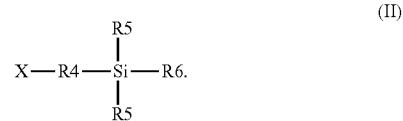

The second modifier is expressed as chemical formula (II):

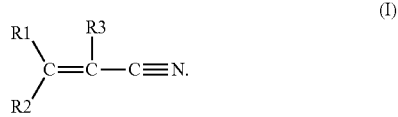

R1 is selected from one of hydrogen, methyl group or ethyl group. R2 is selected from hydrogen. R3 is selected from one of hydrogen, methyl group or ethyl group. X is selected from one of epoxypropoxy group, isocyanate group or 2-(3,4-epoxycyclohexyl) group. R4 is selected from one of alkyl groups with 2~3 carbon atoms. R5 is selected from one of alkoxy groups with 1~3 carbon atoms. R6 is selected from one of alkyl or alkoxy groups with 1~3 carbon atoms.

According to a second aspect the present invention, a modified conjugated diene-vinyl aromatic copolymer is provided. The modified conjugated diene-vinyl aromatic copolymer is formed by modifying a conjugated diene-vinyl aromatic copolymer by reacting with a first modifier in a solvent and then reacting with a second modifier. The solvent contains an organic alkali metal initiator. The first modifier is expressed as chemical formula (I):

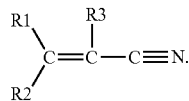

The second modifier is expressed as chemical formula (II):

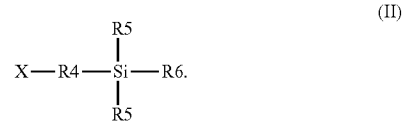

R1 is selected from one of hydrogen, group methyl or group ethyl. R2 is selected from hydrogen. R3 is selected from one of hydrogen, methyl group or ethyl group. X is selected from one of epoxypropoxy group, isocyanate group or 2-(3,4-epoxycyclohexyl) group. R4 is selected from one of alkyl groups with 2~3 carbon atoms. R5 is selected from one of alkoxy groups with 1~3 carbon atoms. R6 is selected from one of alkyl or alkoxy groups with 1~3 carbon atoms. A mole of the first modifier is substantially equal to a mole of the organic alkali metal initiator. A mole of the second modifier is substantially equal to the mole of the organic alkali metal initiator.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

None

DETAILED DESCRIPTION OF THE INVENTION

A rubber composition formed by a modified conjugated diene-vinyl aromatic copolymer manufactured according to embodiments of the invention has excellent performance in wet skid and rolling resistance, and can be used for manufacturing tire. Also, during the process of manufacturing the modified conjugated diene-vinyl aromatic copolymer, there is no need for large scale heating and high-temperature solution, and energy cost is thus greatly reduced in the manufacturing process.

In embodiments of the invention, a two-stage method and a three-stage method are provided for manufacturing the modified conjugated diene-vinyl aromatic copolymer. The two-stage method is disclosed below first. A polymerization reaction is applied to a first mixture to obtain a second mixture. The first mixture comprises an organic alkali metal initiator, a conjugated diene monomer and a vinyl aromatic hydrocarbon monomer. For example, the second mixture in the manufacturing method of the present embodiment comprises a conjugated diene-vinyl aromatic copolymer with an active terminal. The conjugated diene-vinyl aromatic hydrocarbon copolymer comprises a conjugated diene monomer unit and a vinyl aromatic hydrocarbon monomer unit.

The vinyl aromatic hydrocarbon monomer may comprise styrene, α-methyl styrene or a combination thereof. The conjugated diene monomer may comprise 1,3-butadiene, isoprene, 1,3-pentadiene, 2-ethyl-1,3-butadiene, 2,3-dimethyl butadiene, 2-methyl pentadiene, 4-methyl pentadiene, 2,4-hexadiene or a combination thereof. Due to polymerization reaction, the conjugated diene monomer has a 1,4-structure obtained from 1,4-polymerization and a 1,2-structure obtained from 1,2-polymerization. The 1,4-structure and the 1,2-structure may co-exist in a molecular chain. The 1,4-structure can be further divided into a cis-structure and a trans-structure. The 1,2-structure is a structure having a vinyl group at the side chain. The vinyl(1,2) structure amounts to 20%~70% of the weight of the conjugated diene monomer unit of the polymerized copolymer. In some embodiments, the vinyl(1,2) structure amounts to 55%~70%, preferably 63%, of the weight of the conjugated diene monomer unit. The conjugated diene monomer unit amounts to 75%~85%, preferably 79%, of the weight of the manufactured conjugated diene-vinyl aromatic copolymer. The vinyl aromatic hydrocarbon monomer unit amounts to 15%~25%, preferably 21%, of the weight of the manufactured conjugated diene-vinyl aromatic copolymer. In other embodiments, if the vinyl(1,2) structure amounts to 20%~40%, preferably 30%, of the weight of conjugated diene monomer unit, the conjugated diene monomer unit amounts to 80%~90%, preferably 85%, of the weight of the manufactured conjugated diene-vinyl aromatic copolymer, and the vinyl aromatic hydrocarbon monomer unit amounts to 10%~20%, preferably 15%, of the weight of the manufactured conjugated diene-vinyl aromatic copolymer.

In one embodiment, conjugated diene is 1,3-butadiene, and vinyl aromatic hydrocarbon is styrene.

A total weight of the conjugated diene monomer and the vinyl aromatic hydrocarbon monomer: a weight of the organic alkali metal initiator is 100:0.01~0.5. The organic alkali metal initiator comprises ethyl lithium, n-propyl lithium, isopropyl lithium, n-butyllithium, n-pentyl lithium, phenyl lithium, tolyl lithium or a combination thereof.

In some embodiments, the first mixture further comprises a solvent and a micro-structure modifier. The solvent used in the manufacturing method of the present embodiment can also be realized by a non-polar solvent such as a saturated hydrocarbon, an aromatic hydrocarbon, etc. but is not limited thereto. The solvent may use an aliphatic hydrocarbon (such as pentane, hexane, heptane), an alicyclic hydrocarbon (such as cyclopentane, cyclohexane, methyl cyclopentane, methyl cyclohexane, etc), an aromatic hydrocarbon (such as benzene, toluene, xylene, etc), and a hydrocarbon comprising a mixture thereof. In the polymerization process of the present embodiment, for enabling the vinyl aromatic hydrocarbon monomer compound and the conjugated diene monomer compound to be randomly copolymerized, a small amount of polar compound (also referred as the micro-structure modifier) can be added as an vinylating agent. Such polar compound can also be realized by an ether (such as tetrahydrofuran, diethyl ether, dioxane, 1,2-dimethoxyethane, 1,2-dibutoxyethane, diethylene glycol dimethyl ether, diethylene glycol dibutyl ether, dimethoxybenzene, 2,2-ditetrahydrofurylpropane (DTHFP), etc); a tertiary amine (such as tetramethylethylenediamine, dipiperidine ethane, trimethylamine, triethylamine, pyridine, quinuclidine, etc); an alkali metal alkyl alcoholates (such as potassium tert-pentoxide, potassium tert-butoxide, sodium tert-butoxide, sodium tert-pentoxide, etc); a phosphine compound (such as triphenylphosphine, etc); an alkyl or an aryl sulfonic acid compound. These polar compounds can be used individually or as a combination of two or more than two compounds.

In one embodiment, the usage amount of micro-structure modifier is based on target objects and effects. Normally, the mole of the micro-structure modifier is 0.01~100 with respect to 1 mole of the initiator. According to the expected amount of the ethylene (1,2) structure, the polar compound (vinylating agent) can be suitably used as a micro-structure regulator for the diene part of the polymer.

Then, the second mixture is modified to obtain a modified conjugated diene-vinyl aromatic copolymer. The method for modifying the second mixture comprises enabling the second mixture to react with the first modifier to obtain a third mixture. Then, the third mixture further reacts with the second modifier.

The first modifier is expressed as chemical formula (I):

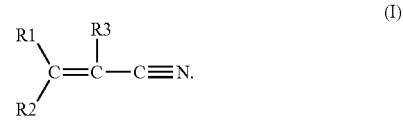

The first modifier comprises acrylonitrile, methyl acrylonitrile, ethyl acrylonitrile, 2-butenenitrile, 2-pentenenitrile or a combination thereof. The first modifier can be used as a terminator for terminating the polymerization process of the second mixture. Meanwhile, the first modifier used as a modifier performs terminal modification in the second mixture. In one embodiment, the first modifier is added during the polymerization reaction of the second mixture. The mole of the first modifier is substantially 0.7~1.3 times of the mole of the organic alkali metal initiator. In some embodiments, and the mole of the first modifier is substantially equal to the mole of the organic alkali metal initiator.

The second modifier is expressed as chemical formula (II):

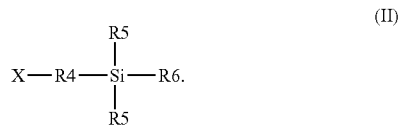

(II)

X is selected from one of epoxypropoxy group, isocyanate group or 2-(3,4-epoxycyclohexyl) group. R4 is selected from one of alkyl groups with 2~3 carbon atoms. R5 is selected from one of alkoxy groups with 1~3 carbon atoms. R6 is selected from one of alkyl or alkoxy groups with 1~3 carbon atoms. The second modifier can participate in the modification of the third mixture. Meanwhile, the second modifier used as a modifier can perform terminal modification on the third mixture. In one embodiment, the second modifier is added after the modification of the third mixture is completed. The mole of the second modifier is substantially 0.7~1.3 times of the mole of the organic alkali metal initiator. In some embodiments, the mole of the second modifier is substantially equal to the mole of the organic alkali metal initiator. In some embodiments, the second modifier may comprise 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane or a combination thereof.

In one embodiment, a poor solvent (such as an alcohol such as methanol, ethanol or isopropyl alcohol) can be added to the modified conjugated diene-vinyl aromatic copolymer obtained from the modification to separate the copolymer out. Alternatively, hot water or water vapor (hotter than the solvent) can be used to remove the solvent so that the copolymer can be separated out. In one embodiment, the polydispersity index (PDI) of the modified conjugated diene-vinyl aromatic copolymer obtained from the modification is substantially 1~3. The average molecular weight of the modified conjugated diene-vinyl aromatic copolymer is substantially 20000~1000000. The gel permeation chromatography (GPC, Waters Company Made) possesses the functions of differential curvature detection and light scattering detection can be used as an initial detection device.

The processes of the three-stage method are disclosed below. The three-stage method is different from the two-stage method in that: a fourth mixture is obtained after the third mixture in the two-stage method reacts with the second modifier. In addition, the fourth mixture is modified by reacting with a third modifier. The third modifier is expressed as chemical formula (III):

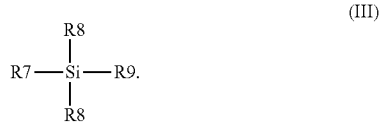

(III)

R7 is selected from one of alkyl group, alkoxy group, aromatic group, aroxyl group or cycloalkyl group with 1~12 carbon atoms. R8 is selected from one of alkoxy group or aroxyl group with 1~12 carbon atoms. R9 is selected from one of alkyl group, alkoxy group, aroxyl group or cycloalkyl group with 1~12 carbon atoms. In another embodiment, R7 is selected from one of ethyl group, decyl group, methoxy group, ethoxy group, decyl-oxy group, phenyl group, phenoxy group or cyclohexyl group. R8 is selected from one of methoxy group, ethoxy group, n-butoxide group, decyl-oxy group or phenoxy group. R9 is selected from one of methoxy group, ethoxy group, n-butoxide group, decyl-oxy group, phenoxy group, cyclohexyl group or decyl group. The third modifier can participate in the modification of the fourth mixture. Meanwhile, the third modifier which performs terminal modification on the fourth mixture can be used as a modifier. In one embodiment, the third modifier is added after the modification of the fourth mixture is completed. The mole of the third modifier is substantially 0.7~1.3 times of the mole of the organic alkali metal initiator. In some embodiments, the mole of the third modifier is substantially equal to the mole of the organic alkali metal initiator, so that the mole of the first modifier, the mole of the second modifier, and the mole of the third modifier are substantially the same, and are substantially equal to the mole of the organic alkali metal initiator. The third modifier may comprise tetraethoxysilane, ethyl(trimethoxy)silane, phenyl(tri-n-butoxy)silane, dicyclohexyl (diphenoxy)silane, didecyl(didecoxy)silane, tetradodecoxysilane, tetraphenoxysilane or a combination thereof.

A number of embodiments and comparative examples clearly describe the manufacturing process using various chemical components as modifiers in macromolecular polymerization. The property differences between the rubber compositions formed from the modified conjugated diene-vinyl aromatic copolymer manufactured according to these embodiments and comparative examples are further compared. Embodiments 1~4 elaborate the modified conjugated diene-vinyl aromatic copolymer manufactured by the two-stage method. Embodiments 5~8 elaborate the modified conjugated diene-vinyl aromatic copolymer manufactured by the three-stage method. Comparative examples 1~4 elaborate the conjugated diene-vinyl aromatic copolymer manufactured by a conventional manufacturing process. The property differences between rubber compositions formed from the modified conjugated diene-vinyl aromatic copolymer manufactured according to these embodiments and comparative examples are further compared. Unless otherwise stated, in the descriptions for the manufacturing process for the modified conjugated diene-vinyl aromatic copolymer, the unit phr (parts per hundreds of rubber) of a specific substance is defined with respect to 100 weight parts of the whole styrene monomer and butadiene monomer. For example, "0.3 phr of n-butyllithium" refers to 0.3 weight parts of n-butyllithium per 100 weight parts of styrene monomer and butadiene monomer. In the process of manufacturing rubber composition, the unit phr is of a specific substance is defined with respect to 100 weight parts of terminal-modified conjugated diene-vinyl aromatic copolymer. For 120 example, "30 phr of silica" refers to 30 weight parts of silica per 100 weight parts of modified styrene-butadiene copolymer.

Embodiment 1

Firstly, 800 g of cyclohexane used as a solvent are added to a reactor, and a constant temperature of 45° C. is maintained. Next, 0.3 phr of 2,2-ditetrahydrofurylpropane used as a structure modifier are added to the reactor. Then, 0.048 phr of n-butyllithium used as an initiator for a polymerization reaction are added to the reactor. Afterwards, 44.7 g of styrene used as the first monomer and 168.3 g of butadiene used as the second monomer are added to the reactor for the polymerization reaction, and the feeding duration is 50 minutes. After the polymerization reaction is performed for about 55 minutes, 3.5 phr of butadiene used as a polymer chain terminal are added. Meanwhile, the solution is sampled and the solvent is removed. The measurement results obtained by infra-red (IR) or nuclear magnetic resonance (NMR) spectroscopy show that the vinyl(1,2) structure of the polymer amounts to 63% of the cis-, the trans- and the vinyl structure of the butadiene monomer unit. The styrene monomer unit of the polymer approximately amounts to 21% of the weight of the overall butadiene monomer unit and styrene monomer unit. After about 5 minutes, acrylonitrile whose mole is 1.05 times of the mole of the initiator is added and the mixture is blended for 10 minutes. After that, 3-glycidoxypropyltrimethoxysilane whose mole is 1.05 times of the mole of the initiator is added and the mixture is discharged after blending for 10 minutes. A modified conjugated diene-vinyl aromatic copolymer is obtained after cyclohexane is removed with hot water and a drying process. The average molecular weight of the obtained modified conjugated diene-vinyl aromatic copolymer is 470000. The average molecular number of the modified conjugated diene-vinyl aromatic copolymer is 307000. The polydispersity index (PDI) of the modified conjugated diene-vinyl aromatic copolymer is Mw/Mn=1.53.

Embodiment 2

Except that the added 3-glycidoxypropyltrimethoxysilane is replaced by 3-(triethoxysilyl)propylisocyanate, the remaining processes of the present embodiment are similar to that of embodiment 1, and thus the similarities are not repeated. The average molecular weight of the obtained modified conjugated diene-vinyl aromatic copolymer is 504000. The average molecular number of the modified conjugated diene-vinyl aromatic copolymer is 292000. The polydispersity index (PDI) of the modified conjugated diene-vinyl aromatic copolymer is Mw/Mn=1.73.

Comparative Example 1

Except that the added acrylonitrile and 3-glycidoxypropyltrimethoxysilane is replaced by methanol, the remaining processes of the present embodiment are similar to that of embodiment 1, and thus the similarities are not repeated. The average molecular weight of the obtained conjugated diene-vinyl aromatic copolymer is 464000. The average molecular number of the conjugated diene-vinyl aromatic copolymer is 328000. The polydispersity index (PDI) of the conjugated diene-vinyl aromatic copolymer is Mw/Mn=1.42.

Comparative Example 2

Except that the added 3-glycidoxypropyltrimethoxysilane is replaced by methanol, the remaining processes of the present embodiment are similar to that of embodiment 1, and thus the similarities are not repeated. The obtained aromatic copolymer is acrylonitrile-modified conjugated diene-vinyl aromatic copolymer.

Embodiment 3

Firstly, 800 g of cyclohexane used as a solvent are added to a reactor, and a constant temperature of 45° C. is maintained. Next, 0.03 phr of 2,2-ditetrahydrofurylpropane used as a structure modifier are added to the reactor. Then, 0.048 phr of n-butyllithium used as an initiator for the polymerization reaction are added to a reactor. Afterwards, 26.3 g of styrene used as the first monomer and 149.3 g of butadiene used as the second monomer are added to the reactor for the polymerization reaction, wherein the feeding duration is 50 minutes. After polymerization reaction is performed for about 55 minutes, 3.5 phr of butadiene used as a polymer chain terminal are added. Meanwhile, the solution is sampled and the solvent is removed. The measurement results obtained by infra-red (IR) or nuclear magnetic resonance (NMR) spectroscopy show that the vinyl(1,2) structure of polymer amounts to 30% of the cis-, the trans and the vinyl of the butadiene. The styrene of the polymer approximately amounts to 15% of the weight of the overall butadiene and styrene. After about 5 minutes, acrylonitrile whose mole is 1.05 times of that of the initiator is added and the mixture is blended for 10 minutes. After that, 3-glycidoxypropyltrimethoxysilane whose mole is 1.05 times of the mole of the initiator is added and the mixture is discharged after blending for 10 minutes. A modified conjugated diene-vinyl aromatic copolymer is obtained after cyclohexane is removed with hot water and a drying process. The average molecular weight of the obtained modified conjugated diene-vinyl aromatic copolymer is 488000. The average molecular number of the modified conjugated diene-vinyl aromatic copolymer is 299000. The polydispersity index (PDI) of the modified conjugated diene-vinyl aromatic copolymer is Mw/Mn=1.63.

Embodiment 4

Except that the added 3-glycidoxypropyltrimethoxysilane is replaced by 3-(triethoxysilyl)propylisocyanate, the remaining processes of the present embodiment are similar to that of embodiment 3, and thus the similarities are not repeated. The average molecular weight of the obtained modified conjugated diene-vinyl aromatic copolymer is 591000. The average molecular number of the modified conjugated diene-vinyl aromatic copolymer is 326000. The polydispersity index (PDI) of the modified conjugated diene-vinyl aromatic copolymer is Mw/Mn=1.82.

Comparative Example 3

Except that the added acrylonitrile and 3-glycidoxypropyltrimethoxysilane are both replaced by methanol, the remaining processes of the present embodiment are similar to that of embodiment 3, and thus the similarities are not repeated. The average molecular weight of the obtained modified conjugated diene-vinyl aromatic copolymer is 784000. The average molecular number of the modified conjugated diene-vinyl aromatic copolymer is 450000. The polydispersity index (PDI) of the modified conjugated diene-vinyl aromatic copolymer is Mw/Mn=1.74.

Comparative Example 4

Except that the added 3-glycidoxypropyltrimethoxysilane is replaced by methanol, the remaining processes of the present embodiment are similar to that of embodiment 3, and thus the similarities are not repeated. The obtained aromatic copolymer is acrylonitrile-modified conjugated diene-vinyl aromatic copolymer.

Next, the modified conjugated diene-vinyl aromatic copolymer manufactured according to each example of the two-stage method is used for forming rubber compositions, and the properties of each rubber composition are tested. The following ingredients are used for forming the rubber compositions of embodiments 1~4 and comparative examples 1~3:

Silica (made by ULTRASIL EVONIK)

Oil (#3, made by CPC Corporation of Taiwan)

Antioxidant (Ix-1076, made by CIBA)

Si69 (bi-3-(triethoxysilyl propyl)tetrasulfide, made by Degussa AG)

Zinc oxide (ZnO, made by HA)

Stearic acid (TPSA1865)

Diphenyl guanidine (made by FLEXSYS)

N-cyclohexyl-2-benzothiazolesulphenamide (CBS, made by FLEXSYS)

Sulfur (Triangle Brand)

Firstly, after 700 g of modified conjugated diene-vinyl aromatic copolymers manufactured according to embodiments 1~4 and comparative examples 1~3 are respectively blended for 1 minute, 30 phr of silica, 10 phr of oil, 1 phr of antioxidant (Ix-1076), 2 phr of zinc oxide and 2 phr of stearic acid are further added and blended for 1.5 minutes. Then, after 30 phr of silica are added for 1.5 minutes, 2 phr of diphenyl guanidine (DPG) are further added and blended for about 2.5 minutes, and then the mixture is discharged. The above procedure is implemented by a Banbury-type mixer.

Then, after the mixture is aged for 0.5 hours at room temperature, 4.8 phr of silane coupling agent (Si69) are added and well mixed. Then, after the mixture is aged for 24 hours at room temperature, 2 phr of n-cyclohexyl-2-benzothiazolesulphenamide (CBS) and 2 phr of sulfur are added, and a rubber composition is obtained accordingly. The above procedure is implemented with a roll-type mixer. In the following disclosure, the properties of the rubber compositions formed by modified conjugated diene-vinyl aromatic copolymers manufactured according to embodiments 1~4 and comparative examples 1~3 are analyzed and compared.

The properties of each rubber compositions are measured with a viscoelasticity measuring device (model DMA 2800, made by TA Instruments). The measurement mode is stretching mode, and the measuring frequency is 20 Hz. The objects of measurement include dynamic storage modulus of elasticity (E) and loss tangent (tan $\delta$). When measuring the dynamic storage modulus of elasticity (E), the temperature is set at 60° C., the deformation degree of measurement is 0.5~10%. The dynamic storage modulus difference of elasticity ($\Delta E'$) can be obtained by deducting the dynamic storage modulus of elasticity measured when the deformation degree is 10% from the dynamic storage modulus of elasticity measured when the deformation degree is 0.5%. The smaller the value of the dynamic storage modulus difference of elasticity ($\Delta E'$) is, the better the compatibility between the rubber composition and silica is. Besides, the temperature rising rate is 3° C. per minute when measuring the loss tangent (tan $\delta$), and the loss tangent is measured at the temperature of 0° C. and 60° C. The measured deformation is 0.045%. At 0° C., the higher the loss tangent is, the better wet skid the rubber composition has. At 60° C., the higher the loss tangent is, the higher rolling resistance the rubber composition has. Detailed measurement data of rubber compositions formed by the terminal-modified conjugated diene-vinyl aromatic copolymers manufactured according to each example are summarized as Table 1 below.

TABLE 1

| | $\Delta E'$ | tan$\delta$ (0° C.) | tan$\delta$ (60° C.) |
|---|---|---|---|
| Embodiment 1 | 3.4 | 0.979 | 0.054 |
| Embodiment 2 | 3.5 | 0.975 | 0.058 |
| Comparative example 1 | 6.0 | 0.922 | 0.087 |
| Comparative example 2 | 4.5 | 0.952 | 0.072 |
| Embodiment 3 | 4.1 | 0.148 | 0.040 |
| Embodiment 4 | 4.3 | 0.147 | 0.043 |
| Comparative example 3 | 7.4 | 0.140 | 0.063 |

As illustrated in embodiments 1~2 and comparative examples 1~2 in Table 1, the vinyl(1,2) structure amounts to 63% of the cis-, the trans- and the vinyl structure of the butadiene monomer unit, which is high vinyl grade. In the measurement results of the examples in which the vinyl(1,2) grade is high, the dynamic storage modulus differences of elasticity ($\Delta E'$) are 3.4 and 3.5 for embodiment 1 and embodiment 2 respectively, which both are smaller than the dynamic storage modulus differences of elasticity ($\Delta E'$) for comparative example 1 and comparative example 2 which are 6.0 and 4.5 respectively. Such comparison shows that the rubber compositions formed by the modified conjugated diene-vinyl aromatic copolymers manufactured according to embodiment 1 and embodiment 2 are highly compatible with silica. In addition, at 0° C., the measured loss tangents (tan $\delta$) of the rubber compositions formed by the modified conjugated diene-vinyl aromatic copolymers manufactured according to embodiment 1 and embodiment 2 are 0.979 and 0.975 respectively, which both are larger than the loss tangents (tan $\delta$) of the rubber compositions formed by the modified conjugated diene-vinyl aromatic copolymers manufactured according to comparative example 1 and comparative example 2 at 0° C., which are respectively 0.922 and 0.952. Such comparison shows that the rubber compositions formed by the modified conjugated diene-vinyl aromatic copolymers manufactured according to embodiment 1 and embodiment 2 have excellent performance in wet skid. At 60° C., the measured loss tangents (tan $\delta$) of the rubber compositions formed by the modified conjugated diene-vinyl aromatic copolymers manufactured according to embodiment 1 and embodiment 2 are 0.054 and 0.058 respectively, which both are smaller than the loss tangents (tan $\delta$) of the rubber compositions formed by the modified conjugated diene-vinyl aromatic copolymers manufactured according to comparative example 1 and comparative example 2 at 60° C., which are 0.087 and 0.072 respectively. Such comparison shows that the rubber compositions formed by the modified conjugated diene-vinyl aromatic copolymers manufactured according to embodiment 1 and embodiment 2 have excellent performance in rolling resistance.

As illustrated in embodiments 3~4 and comparative example 3 in Table 1, the vinyl(1,2) structure amount to 30% of the cis-, the trans- and the vinyl structure of the butadiene monomer unit, which is medium grade vinyl. In the measurement results of the examples in which the vinyl(1,2) grade is medium, the dynamic storage modulus differences of elasticities ($\Delta E'$) for embodiment 3 and embodiment 4 are 4.1 and 4.3 respectively, which both are far smaller than the dynamic storage modulus difference of elasticity ($\Delta E'$) for comparative example 3, which is 7.4. Such comparison shows that the rubber compositions formed by the modified conjugated diene-vinyl aromatic copolymers manufactured according to embodiment 3 and embodiment 4 are highly compatible with silica. In addition, at 0° C., the measured loss tangents (tan $\delta$)

of the rubber compositions formed by the modified conjugated diene-vinyl aromatic copolymers manufactured according to embodiment 3 and embodiment 4 are 0.148 and 0.147 respectively, which both are larger than the loss tangent (tan δ) of the rubber composition formed by the modified conjugated diene-vinyl aromatic copolymer manufactured according to comparative example 3 at 0° C., which is 0.140. Such comparison shows that the rubber compositions formed by the modified conjugated diene-vinyl aromatic copolymers manufactured according to embodiment 3 and embodiment 4 have excellent performance in wet skid. At 60° C., the measured loss tangents (tan δ) of the rubber compositions formed by the modified conjugated diene-vinyl aromatic copolymers manufactured according to embodiment 3 and embodiment 4 are 0.040 and 0.043 respectively, which both are smaller than the loss tangent (tan δ) of the rubber composition formed by the modified conjugated diene-vinyl aromatic copolymer manufactured according to comparative example 3 at 60° C., which is 0.063. Such comparison shows that the rubber compositions formed by the modified conjugated diene-vinyl aromatic copolymers manufactured according to embodiment 3 and embodiment 4 have excellent performance in rolling resistance.

Embodiment 5

Firstly, 800 g of cyclohexane used as a solvent are added to a reactor, and a constant temperature of 45° C. is maintained. Next, 0.3 phr of 2,2-ditetrahydrofurylpropane used as a structure modifier are added to the reactor. Then, 0.048 phr of n-butyllithium used as an initiator for a polymerization reaction are added to the reactor. Afterwards, 44.7 g of styrene used as the first monomer and 168.3 g of butadiene used as the second monomer are added to the reactor for the polymerization reaction, wherein the feeding duration is 50 minutes. After the polymerization reaction is performed for about 55 minutes, 3.5 phr of butadiene monomer used as a polymer chain terminal are added. Meanwhile, the solution is sampled and the solvent is removed. The measurement results obtained by infra-red (IR) or nuclear magnetic resonance (NMR) spectroscopy show that the vinyl(1,2) structure of the polymer amounts to 63% of the cis-, the trans- and the vinyl structure of the butadiene monomer unit. The styrene monomer unit of the polymer approximates amounts to 21% of the weight of the overall butadiene monomer unit and styrene monomer unit. After about 5 minutes, acrylonitrile whose mole is 1.05 times of the mole of the initiator is added to the mixture and blended for 10 minutes. After that, 3-glycidoxypropyltrimethoxysilane whose mole is 1.05 times of the mole of the initiator is added to the mixture and blended for 10 minutes. Next, tetraethoxysilane whose mole is 1.05 times of the mole of the initiator is added, and the mixture is discharged after blending for 10 minutes. A conjugated diene-vinyl aromatic copolymer is obtained after cyclohexane is removed with hot water and a drying process. The average molecular weight of the obtained modified conjugated diene-vinyl aromatic copolymer is 426000. The average molecular number of the modified conjugated diene-vinyl aromatic copolymer is 225000. The polydispersity index (PDI) of the modified conjugated diene-vinyl aromatic copolymer is Mw/Mn=1.9.

Embodiment 6

Except that the added 3-glycidoxypropyltrimethoxysilane is replaced by 3-(triethoxysilyl)propylisocyanate, the remaining processes of the present embodiment are similar to that of embodiment 5, and thus the similarities are not repeated. The average molecular weight of the obtained modified conjugated diene-vinyl aromatic copolymer is 472000. The average molecular number of the modified conjugated diene-vinyl aromatic copolymer is 279000. The polydispersity index (PDI) of the modified conjugated diene-vinyl aromatic copolymer is Mw/Mn=1.69.

Embodiment 7

Firstly, 800 g of cyclohexane used as a solvent are added to a reactor, and a constant temperature of 45° C. is maintained. Next, 0.03 phr of 2,2-ditetrahydrofurylpropane used as a structure modifier are added to the reactor. Then, 0.048 phr of n-butyllithium used as an initiator for a polymerization reaction are added to the reactor. Afterwards, 26.3 g of styrene used as the first monomer and 149.3 g of butadiene used as the second monomer are added to the reactor for the polymerization reaction, wherein the feeding duration is 50 minutes. After the polymerization reaction is performed for about 55 minutes, 3.5 phr of butadiene monomer used as a polymer chain terminal are added. Meanwhile, the solution is sampled and the solvent is removed. The measurement results obtained by infra-red (IR) or nuclear magnetic resonance (NMR) spectroscopy show that the vinyl(1,2) structure of polymers amounts to 30% of the cis-, the trans- and the vinyl structure of the butadiene monomer unit. The styrene monomer unit of the polymer approximates amounts to 15% of the weight of the butadiene monomer unit and the styrene monomer unit. After about 5 minutes, acrylonitrile whose mole is 1.05 times of the mole of the initiator is added and the mixture is blended for 10 minutes. After that, 3-glycidoxypropyltrimethoxysilane whose mole is 1.05 times of the mole of the initiator is added and the mixture is blended for 10 minutes. Next, tetraethoxysilane whose mole is 1.05 times of the mole of the initiator is added and the mixture is discharged after blending for 10 minutes. A modified conjugated diene-vinyl aromatic copolymer is obtained after cyclohexane is removed with hot water and a drying process. The average molecular weight of the obtained modified conjugated diene-vinyl aromatic copolymer is 410000. The average molecular number of the modified conjugated diene-vinyl aromatic copolymer is 250000. The polydispersity index (PDI) of the modified conjugated diene-vinyl aromatic copolymer is Mw/Mn=1.64.

Embodiment 8

Except that the added 3-glycidoxypropyltrimethoxysilane is replaced by 3-(triethoxysilyl)propylisocyanate, the remaining processes of the present embodiment are similar to that of embodiment 7, and thus the similarities are not repeated. The average molecular weight of the obtained modified conjugated diene-vinyl aromatic copolymer is 473000. The average molecular number of the modified conjugated diene-vinyl aromatic copolymer is 262000. The polydispersity index (PDI) of the modified conjugated diene-vinyl aromatic copolymer is Mw/Mn=1.83.

The processes for forming rubber compositions from the modified conjugated diene-vinyl aromatic copolymers manufactured according to each example of the three-stage method are similar to that of the two-stage method, and thus the similarities are not repeated. Detailed measurement data of rubber compositions formed by the modified conjugated diene-vinyl aromatic copolymers manufactured according to each example of the three-stage method are summarized in Table 2 below.

TABLE 2

|  | ΔE' | tanδ (0° C.) | tanδ (60° C.) |
|---|---|---|---|
| Embodiment 5 | 3.1 | 0.982 | 0.051 |
| Embodiment 6 | 3.2 | 0.980 | 0.055 |
| Comparative example 1 | 6.0 | 0.922 | 0.087 |
| Comparative example 2 | 4.5 | 0.952 | 0.072 |
| Embodiment 7 | 3.8 | 0.150 | 0.038 |
| Embodiment 8 | 3.9 | 0.149 | 0.040 |
| Comparative example 3 | 7.4 | 0.140 | 0.063 |

As illustrated in embodiments 5~6 and comparative examples 1~2 in Table 2, the vinyl(1,2) structure amounts to 63% of the cis-, the trans-, and the vinyl structure of the butadiene monomer unit, which is high vinyl grade. In the measurement results of the examples in which the vinyl(1,2) grade is high, the dynamic storage modulus differences of elasticities (ΔE') are 3.1 and 3.2 for embodiment 5 and embodiment 6 respectively, which both are smaller than the dynamic storage modulus differences of elasticities (ΔE') for comparative example 1 and comparative example 2, which are 6.0 and 4.5 respectively. Such comparison shows that the rubber compositions formed by the modified conjugated diene-vinyl aromatic copolymers manufactured according to embodiment 5 and embodiment 6 are highly compatible with silica. In addition, at 0° C., the measured loss tangents (tan δ) of the rubber compositions formed by the modified conjugated diene-vinyl aromatic copolymers manufactured according to embodiment 5 and embodiment 6 are 0.982 and 0.980 respectively, which both are larger than the loss tangents (tan δ) of the rubber compositions formed by the modified conjugated diene-vinyl aromatic copolymers manufactured according to comparative example 1 and comparative example 2 at 0° C., which are respectively 0.922 and 0.952. Such comparison shows that the rubber compositions formed by the modified conjugated diene-vinyl aromatic copolymers manufactured according to embodiment 5 and embodiment 6 have excellent performance in wet skid. At 60° C., the measured loss tangents (tan δ) of the rubber compositions formed by the modified conjugated diene-vinyl aromatic copolymers manufactured according to embodiment 5 and embodiment 6 are 0.051 and 0.055 respectively, which both are smaller than the loss tangents (tan δ) of the rubber compositions formed by the modified conjugated diene-vinyl aromatic copolymers manufactured according to comparative example 1 and comparative example 2 at 60° C., which are 0.087 and 0.072 respectively. Such comparison shows that the rubber compositions formed by the modified conjugated diene-vinyl aromatic copolymers manufactured according to embodiment 5 and embodiment 6 have excellent performance in rolling resistance.

As illustrated in embodiments 7~8 and comparative example 3 in Table 2, the vinyl(1,2) structure amount to 30% of the cis- and the trans- and the vinyl structure of the butadiene monomer unit, which is medium grade vinyl. In the measurement results of the examples in which the vinyl(1,2) grade is medium, the dynamic storage modulus differences of elasticity (ΔE') for embodiment 7 and embodiment 8 are 3.8 and 3.9 respectively, which both are far smaller than the dynamic storage modulus difference of elasticity (ΔE') for comparative example 3, which is 7.4. Such comparison shows that the rubber compositions formed by the modified conjugated diene-vinyl aromatic copolymer manufactured according to embodiment 7 and embodiment 8 are highly compatible with silica. In addition, at 0° C., the measured loss tangents (tan δ) of the rubber compositions formed by the modified conjugated diene-vinyl aromatic copolymers manufactured according to embodiment 7 and embodiment 8 are 0.150 and 0.149 respectively, which both are larger than the loss tangent (tan δ) of the rubber composition formed by the modified conjugated diene-vinyl aromatic copolymer manufactured according to comparative example 3 at 0° C., which is 0.140. Such comparison shows that the rubber compositions formed by the modified conjugated diene-vinyl aromatic copolymers manufactured according to embodiment 7 and embodiment 8 have excellent performance in wet skid. At 60° C., the measured loss tangents (tan δ) of the rubber compositions formed by the modified conjugated diene-vinyl aromatic copolymers manufactured according to embodiment 7 and embodiment 8 are 0.038 and 0.040 respectively, which both are smaller than the loss tangent (tan δ) of the rubber composition formed by the modified conjugated diene-vinyl aromatic copolymer manufactured according to comparative example 3 at 60° C., which is 0.063. Such comparison shows that the rubber compositions formed by the modified conjugated diene-vinyl aromatic copolymers manufactured according to embodiment 7 and embodiment 8 have excellent performance in rolling resistance.

TABLE 3

|  | Wear Resistance (c.c.) | Scorching Time ts2 (minute' second") | Vinyl Grade | Manufacturing Process |
|---|---|---|---|---|
| Embodiment 1 | 0.107 | 4'04" | High | Two-Stage |
| Embodiment 2 | 0.111 | 4'21" | High | Two-Stage |
| Embodiment 3 | 0.065 | 4'26" | Medium | Three-Stage |
| Embodiment 4 | 0.07 | 4'28" | Medium | Three-Stage |
| Embodiment 5 | 0.075 | 5'22" | High | Two-Stage |
| Embodiment 6 | 0.082 | 5'04" | High | Two-Stage |
| Embodiment 7 | 0.058 | 4'51" | Medium | Three-Stage |
| Embodiment 8 | 0.062 | 4'42" | Medium | Three-Stage |
| Comparative example 1 | 0.135 | 4'16" | High | — |
| Comparative example 2 | 0.118 | 4'32" | High | One-Stage |
| Comparative example 3 | 0.099 | 3'38" | Medium | One-Stage |
| Comparative example 4 | 0.089 | 3'27" | Medium | — |

The measurement results of wear resistance and scorching time for embodiments 1~8 and comparative examples 1~4 are summarized in Table 3. The wear resistance is measured with an abrasion testing machine GT-7012-D with reference to the measurement using DIN53 516. The size of the specimen is 29 mm (diameter)*12.5 mm (thickness). The smaller the reading of wear resistance is, the better the wear resistance is. The scorching time ts2 is based on 8 g of testing sample measured for 60 minutes with a RHDOMETER MDR2000 machine at 160° C. The scorching time ts2 is the required time for hardening the rubber after blending, which denotes the available length of processing time before the rubber starts to be hardened.

Table 3 shows that the two-stage modified conjugated diene-vinyl aromatic copolymer with high vinyl grade (such as embodiments 1~2) has superior performance in wear resistance than both the non-modified conjugated diene-vinyl aromatic copolymer manufactured according to the comparative example 1 and the AN-modified conjugated diene-vinyl aromatic copolymer manufactured according to comparative example 2. The performance in the wear resistance of the two-stage modified conjugated diene-vinyl aromatic copolymer with medium vinyl grade (such as embodiments 3~4) is better than that of the non-modified conjugated diene-vinyl aromatic copolymer manufactured according to comparative example 3 and that of the only-AN-modified conjugated diene-vinyl aromatic copolymer manufactured according to comparative example 4. In terms of scorching time ts2, the two-stage modified conjugated diene-vinyl aromatic copolymer with medium vinyl grade manufactured according to embodiments also has longer processing time than those of the non-modified conjugated diene-vinyl aromatic copolymer manufactured according to comparative example 3 and the only-AN-modified conjugated diene-vinyl aromatic copolymer manufactured according to comparative example 4.

Table 3 shows that the three-stage modified conjugated diene-vinyl aromatic copolymer with high vinyl grade is used (such as embodiments 5~6) has superior performance in wear resistance than both the non-modified conjugated diene-vinyl aromatic copolymer manufactured according to the comparative example 1 and the AN-modified conjugated diene-vinyl aromatic copolymer manufactured according to comparative example 2. The performance in the wear resistance of the two-stage modified conjugated diene-vinyl aromatic copolymer with medium vinyl grade (such as embodiments 7~8) is better than that of the non-modified conjugated diene-vinyl aromatic copolymer manufactured according to comparative example 3 and that of the only-AN-modified conjugated diene-vinyl aromatic copolymer manufactured according to comparative example 4. In terms of scorching time ts2, the three-stage modified conjugated diene-vinyl aromatic copolymers with high/medium vinyl grade also have longer processing time than that of the non-modified conjugated diene-vinyl aromatic copolymer manufactured according to comparative examples 1 and 3 and that of the only-AN-modified conjugated diene-vinyl aromatic copolymer manufactured according to comparative examples 2 and 4.

According to the modified conjugated diene-vinyl aromatic copolymer and the method for manufacturing the same disclosed in the above embodiments of the invention, the blending technology is not used and the modified conjugated diene-vinyl aromatic copolymer can be obtained through a direct reaction. Therefore, a large amount of energy cost can be saved in the process of manufacturing the modified conjugated diene-vinyl aromatic copolymer. The obtained modified conjugated diene-vinyl aromatic copolymer is highly compatible with silica, and has excellent performance in both wet skid and rolling resistance.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a modified conjugated diene-vinyl aromatic copolymer, comprising modifying a conjugated diene-vinyl aromatic copolymer by reacting with a first modifier and then reacting with a second modifier;
wherein the conjugated diene-vinyl aromatic copolymer is formed by polymerizing a conjugated diene monomer and a vinyl aromatic hydrocarbon monomer in a solvent containing an organic alkali metal initiator, the first modifier is expressed as chemical formula (I):

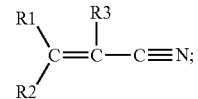

the second modifier is expressed as chemical formula (II):

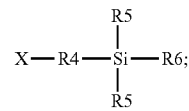

wherein R1 is selected from one of hydrogen, methyl group or ethyl group, R2 is selected from hydrogen, R3 is selected from one of hydrogen, methyl group or ethyl group, X is selected from one of epoxypropoxy group, isocyanate group or 2-(3,4-epoxycyclohexyl) group, R4 is selected from one of alkyl groups with 2~3 carbon atoms, R5 is selected from one of alkoxy groups with 1~3 carbon atoms, and R6 is selected from one of alkyl or alkoxy groups with 1~3 carbon atoms.

2. The method for manufacturing the modified conjugated diene-vinyl aromatic copolymer according to claim 1, further comprising modifying the conjugated diene-vinyl aromatic copolymer by reacting with a third modifier after reacting with the first modifier and the second modifier;
wherein the third modifier is expressed as chemical formula (III):

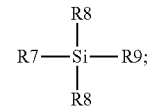

wherein R7 is selected from one of alkyl group, alkoxy group, aromatic group, aroxyl group or cycloalkyl group with 1~12 carbon atoms, R8 is selected from one of alkoxy group or aroxyl group with 1~12 carbon atoms, and R9 is selected from one of alkyl group, alkoxy group, aroxyl group or cycloalkyl group with 1~12 carbon atoms.

3. The method for manufacturing the modified conjugated diene-vinyl aromatic copolymer according to claim 2, wherein the third modifier comprises tetraethoxysilane, ethyl (trimethoxy)silane, phenyl(tri-n-butoxy)silane, dicyclohexyl (diphenoxy)silane, didecyl(didecoxy)silane, tetradodecoxysilane, tetraphenoxysilane or a combination thereof.

4. The method for manufacturing the modified conjugated diene-vinyl aromatic copolymer according to claim 2, wherein the number of moles of the third modifier is about 0.7-1.3 times the number of moles of the organic alkali metal initiator.

5. The method for manufacturing the modified conjugated diene-vinyl aromatic copolymer according to claim 1, wherein the copolymer comprises a conjugated diene monomer unit and a vinyl aromatic hydrocarbon monomer unit, the conjugated diene monomer unit further comprises a vinyl structure, the vinyl structure substantially amounts to 20%~70% of the conjugated diene monomer unit of the copolymer.

6. The method for manufacturing the modified conjugated diene-vinyl aromatic copolymer according to claim 5, wherein the conjugated diene monomer is 1,3-butadiene, and the vinyl aromatic hydrocarbon monomer is styrene.

7. The method for manufacturing the modified conjugated diene-vinyl aromatic copolymer according to claim 6, wherein the vinyl structure substantially amounts to 55%~70% of the conjugated diene monomer unit, the conjugated diene monomer unit substantially amounts to 75%~85% of a weight of the conjugated diene-vinyl aromatic copolymer, and the vinyl aromatic hydrocarbon monomer unit substantially amounts to 15%~25% of the weight of the conjugated diene-vinyl aromatic copolymer.

8. The method for manufacturing the modified conjugated diene-vinyl aromatic copolymer according to claim 6, wherein the vinyl structure substantially amounts to 20%~40% of the conjugated diene monomer unit, the conjugated diene monomer unit substantially amounts to 80%~90% of a weight of the conjugated diene-vinyl aromatic copolymer, and the vinyl aromatic hydrocarbon monomer unit substantially amounts to 10%~20% of the weight of the conjugated diene-vinyl aromatic copolymer.

9. The method for manufacturing the modified conjugated diene-vinyl aromatic copolymer according to claim 1, wherein the number of moles of the first modifier is about 0.7-1.3 times the number of moles of the organic alkali metal initiator, and the number of moles of the second modifier is about 0.7-1.3 times the number of moles of the organic alkali metal initiator.

10. The method for manufacturing the modified conjugated diene-vinyl aromatic copolymer according to claim 1, wherein a total weight of the conjugated diene monomer and the vinyl aromatic hydrocarbon monomer: a weight of the organic alkali metal initiator is 100:0.01~0.5.

11. The method for manufacturing the modified conjugated diene-vinyl aromatic copolymer according to claim 1, wherein the second modifier comprises 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane or a combination thereof.

12. A modified conjugated diene-vinyl aromatic copolymer, wherein the modified conjugated diene-vinyl aromatic copolymer is formed by modifying a conjugated diene-vinyl aromatic copolymer by reacting with a first modifier in a solvent and then reacting with a second modifier, the solvent contains an organic alkali metal initiator, and the first modifier is expressed as chemical formula (I):

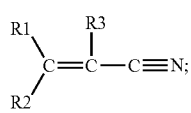

(I)

the second modifier is expressed as chemical formula (II):

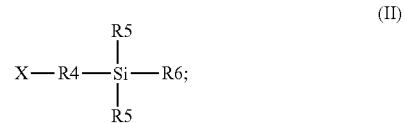

(II)

wherein R1 is selected from one of hydrogen, methyl group or ethyl group, R2 is selected from hydrogen, R3 is selected from one of hydrogen, methyl group or ethyl group, X is selected from one of epoxypropoxy group, isocyanate group or 2-(3,4-epoxycyclohexyl) group, R4 is selected from one of alkyl groups with 2~3 carbon atoms, R5 is selected from one of alkoxy groups with 1~3 carbon atoms, and R6 is selected from one of alkyl or alkoxy groups with 1~3 carbon atoms.

13. The modified conjugated diene-vinyl aromatic copolymer according to claim 12, wherein the copolymer comprises a conjugated diene monomer unit and a vinyl aromatic hydrocarbon monomer unit, the conjugated diene monomer unit further comprises a vinyl structure, the vinyl structure substantially amounts to 20%~70% of the conjugated diene monomer unit of the copolymer.

14. The modified conjugated diene-vinyl aromatic copolymer according to claim 13, wherein the conjugated diene monomer unit is a 1,3-butadiene monomer unit, and the vinyl aromatic hydrocarbon monomer unit is a styrene monomer unit.

15. The modified conjugated diene-vinyl aromatic copolymer according to claim 13, wherein the vinyl structure substantially amounts to 55%~70% of the conjugated diene monomer unit, the conjugated diene monomer unit substantially amounts to 75%~85% of a weight of the conjugated diene-vinyl aromatic copolymer, and the vinyl aromatic hydrocarbon monomer unit substantially amounts to 15%~25% of the weight of the conjugated diene-vinyl aromatic copolymer.

16. The modified conjugated diene-vinyl aromatic copolymer according to claim 13, wherein the vinyl structure substantially amounts to 20%~40% of the conjugated diene monomer unit, the conjugated diene monomer unit substantially amounts to 80%~90% of a weight of the conjugated diene-vinyl aromatic copolymer, and the vinyl aromatic hydrocarbon monomer unit substantially amounts to 10%~20% of the weight of the conjugated diene-vinyl aromatic copolymer.

17. The modified conjugated diene-vinyl aromatic copolymer according to claim 12, wherein the number of moles of the first modifier is about 0.7-1.3 times the number of moles of the organic alkali metal initiator, and the number of moles of the second modifier is about 0.7-1.3 times the number of moles of the organic alkali metal initiator.

18. The modified conjugated diene-vinyl aromatic copolymer according to claim 17, wherein the modified conjugated diene-vinyl aromatic copolymer is formed by modifying the conjugated diene-vinyl aromatic copolymer by reacting with a third modifier after reacting with the first modifier and the second modifier, the third modifier is expressed as chemical formula (III):

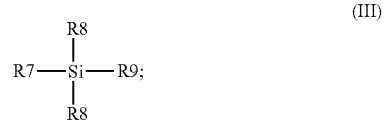

(III)

wherein R7 is selected from one of alkyl group, alkoxy group, aromatic group, aroxyl group or cycloalkyl group with 1~12 carbon atoms, R8 is selected from one of alkoxy group or aroxyl group with 1~12 carbon atoms, and R9 is selected from one of alkyl group, alkoxy group, aroxyl group or cycloalkyl group with 1~12 carbon atoms.

19. The modified conjugated diene-vinyl aromatic copolymer according to claim 18, wherein the third modifier comprises tetraethoxysilane, ethyl(trimethoxy)silane, phenyl(tri-n-butoxy)silane, dicyclohexyl(diphenoxy)silane, didecyl(didecoxy)silane, tetradodecoxysilane, tetraphenoxysilane or a combination thereof.

20. The modified conjugated diene-vinyl aromatic copolymer according to claim 12, wherein the second modifier comprises 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane or a combination thereof.

21. The modified conjugated diene-vinyl aromatic copolymer according to claim 12, wherein the organic alkali metal initiator comprises ethyl lithium, n-propyl lithium, isopropyl lithium, n-butyllithium, n-pentyl lithium, phenyl lithium, tolyl lithium or a combination thereof.

22. The modified conjugated diene-vinyl aromatic copolymer according to claim 12, wherein an average molecular weight of the modified conjugated diene-vinyl aromatic copolymer is substantially 20000~1000000.

23. The modified conjugated diene-vinyl aromatic copolymer according to claim 12, wherein a polydispersity index (PDI) of the molecular weight of the modified conjugated diene-vinyl aromatic copolymer is substantially 1~3.

24. A modified conjugated diene-vinyl aromatic copolymer, wherein the modified conjugated diene-vinyl aromatic copolymer is formed by modifying a conjugated diene-vinyl aromatic copolymer by reacting with a first modifier in a solvent and then reacting with a second modifier, wherein the solvent contains an organic alkali metal initiator, and the first modifier is expressed as chemical formula (I):

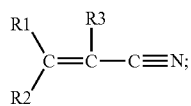
(I)

the second modifier is expressed as chemical formula (II):

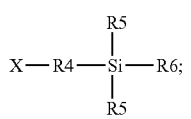
(II)

wherein R1 is selected from one of hydrogen, methyl group or ethyl group, R2 is selected from hydrogen, R3 is selected from one of hydrogen, methyl group or ethyl group, X is selected from one of epoxypropoxy group, isocyanate group or 2-(3,4-epoxycyclohexyl) group, R4 is selected from one of alkyl groups with 2~3 carbon atoms, R5 is selected from one of alkoxy groups with 1~3 carbon atoms, and R6 is selected from one of alkyl or alkoxy groups with 1~3 carbon atoms;

wherein the number of moles of the first modifier is substantially equal to the number of moles of the organic alkali metal initiator, and the number of moles of the second modifier is substantially equal to the number of moles of the organic alkali metal initiator.

25. The modified conjugated diene-vinyl aromatic copolymer according to claim 24, wherein the copolymer comprises a 1,3-butadiene monomer unit and a styrene monomer unit.

26. The modified conjugated diene-vinyl aromatic copolymer according to claim 25, wherein the butadiene unit comprises a vinyl structure, the vinyl structure substantially amounts to 55%~70% of the conjugated diene monomer unit, the butadiene monomer unit substantially amounts to 75%~85% of a weight of the butadiene-styrene copolymer, and the styrene monomer unit substantially amounts to 15%~25% of the weight of the butadiene-styrene copolymer.

27. The modified conjugated diene-vinyl aromatic copolymer according to claim 25, wherein the butadiene unit comprises a vinyl structure, the vinyl structure substantially amounts to 20%~40% of the conjugated diene monomer unit, the conjugated diene monomer unit substantially amounts to 80%~90% of a weight of the butadiene-styrene copolymer, and the vinyl aromatic hydrocarbon monomer unit substantially amounts to 10%~20% of the weight of the butadiene-styrene copolymer.

28. The modified conjugated diene-vinyl aromatic copolymer according to claim 24, wherein the modified conjugated diene-vinyl aromatic copolymer is formed by modifying the conjugated diene-vinyl aromatic copolymer by reacting with a third modifier after reacting with the first modifier and the second modifier, the third modifier is expressed as chemical formula (III):

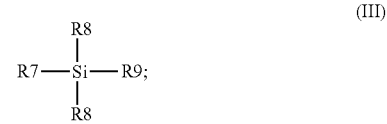
(III)

wherein R7 is selected from one of alkyl group, alkoxy group, aromatic group, aroxyl group or cycloalkyl group with 1~12 carbon atoms, R8 is selected from one of alkoxy group or aroxyl group with 1~12 carbon atoms, R9 is selected from one of alkyl group, alkoxy group, aroxyl group or cycloalkyl group with 1~12 carbon atoms, and the number of moles of the third modifier is substantially equal to the number of moles of the organic alkali metal initiator.

29. The modified conjugated diene-vinyl aromatic copolymer according to claim 28, wherein the third modifier is selected from tetraethoxysilane.

30. The modified conjugated diene-vinyl aromatic copolymer according to claim 24, wherein the second modifier comprises 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane or a combination thereof.

31. The modified conjugated diene-vinyl aromatic copolymer according to claim 24, wherein the organic alkali metal initiator comprises ethyl lithium, n-propyl lithium, isopropyl lithium, n-butyllithium, n-pentyl lithium, phenyl lithium, tolyl lithium or a combination thereof.

* * * * *